(12) United States Patent
Xu et al.

(10) Patent No.: US 10,098,453 B1
(45) Date of Patent: Oct. 16, 2018

(54) FOLDABLE GREENING RACK

(71) Applicant: ZHEJIANG MINZO NEW MATERIALS CO., LTD., Tiantai, Zhejiang (CN)

(72) Inventors: Cungao Xu, Zhejiang (CN); Baohua Wang, Zhejiang (CN)

(73) Assignee: ZHEJIANG MINZO NEW MATERIALS CO., LTD., Tiantai, Zhejiang (CN)

( * ) Notice: Subject to any disclaimer, the term of this patent is extended or adjusted under 35 U.S.C. 154(b) by 0 days.

(21) Appl. No.: 15/811,687

(22) Filed: Nov. 14, 2017

(30) Foreign Application Priority Data

Sep. 15, 2017 (CN) .......................... 2017 1 0834686

(51) Int. Cl.
*A47B 43/00* (2006.01)
*A47G 7/04* (2006.01)

(52) U.S. Cl.
CPC .............. *A47B 43/00* (2013.01); *A47G 7/041* (2013.01)

(58) Field of Classification Search
CPC ........ A41G 1/00; A41G 1/001; B60R 13/005; A47B 43/00; A47B 95/04; A47G 7/041; B22D 25/02; B44C 5/06; Y10T 29/49945
USPC .................... 428/15, 17, 24; 47/41.01, 41.12
See application file for complete search history.

(56) References Cited

U.S. PATENT DOCUMENTS

| | | | | |
|---|---|---|---|---|
| 153,244 A * | 7/1874 | Crandall | ................ | A63H 3/16 446/97 |
| 1,711,031 A * | 4/1929 | Richards | ............... | A41D 25/027 24/64 |
| 2,172,132 A * | 9/1939 | Schneible | ............... | F16B 19/06 267/47 |
| 2,568,996 A * | 9/1951 | Evans | ..................... | B32F 17/08 211/10 |
| 3,452,476 A * | 7/1969 | Kise | ......................... | A01G 5/00 248/27.8 |
| 3,551,963 A * | 1/1971 | Mosher, Jr. et al. | ......................... | A44B 17/0029 24/618 |
| 3,574,901 A * | 4/1971 | Nogue | ..................... | A42B 1/12 24/304 |
| 3,819,458 A * | 6/1974 | Kinderman | .............. | A41G 1/00 248/27.8 |
| 4,816,301 A * | 3/1989 | Weitz | ....................... | A41G 1/00 428/100 |
| 4,835,024 A * | 5/1989 | Hallay | ..................... | A41G 1/00 248/27.8 |

(Continued)

*Primary Examiner* — Ko H Chan
(74) *Attorney, Agent, or Firm* — Global IP Services; Tianhua Gu

(57) ABSTRACT

A foldable greening rack, a plurality of first supporting rods are overlaid and intersect with a plurality of second supporting rods, they are in hinged connection through rivets to form the latticed greening rack; an upper end face of a base is centrally provided with a first column; the upper end of the first column is provided with a first cone boss; an upper end face of the first cone boss is centrally provided with a second column; an upper end of the second column is provided with a second cone boss; the outer diameter of the first cone boss and the outer diameter of the base are both greater than the outer diameter of the first column, the outer diameter of the second cone boss is greater than the outer diameter of the second column, and the outer diameter of the first cone boss is greater than the outer diameter of the second cone boss.

7 Claims, 4 Drawing Sheets

(56) References Cited

U.S. PATENT DOCUMENTS

| | | | | | |
|---|---|---|---|---|---|
| 5,588,895 | A | * | 12/1996 | Larson | A63H 3/00 |
| | | | | | 428/13 |
| 5,901,381 | A | * | 5/1999 | Nelson | A41D 20/00 |
| | | | | | 2/171 |
| 8,112,963 | B2 | * | 2/2012 | Johnson | B32B 3/08 |
| | | | | | 52/698 |

* cited by examiner

FOLDABLE GREENING RACK

TECHNICAL FIELD

The present invention belongs to the technical field of fences or indoor and outdoor greening, and relates to a foldable greening rack.

BACKGROUND ART

Currently, some courtyards, gardens or partition walls or ceilings in rooms are equipped with artificial plants with a greening effect to look good or make people feel like they are actually in nature. However, as artificial plants available in the market now need to be wound around or tied to frames on fences, railings or ceilings, the assembly is hard, the production cost is high, the appearance is poor, and artificial plants are prone to detachment.

SUMMARY OF THE INVENTION

The present invention aims to provide a telescopic greening rack which is firm in connection, attractive in appearance and low in production cost.

The object of the present invention is realized by:

a foldable greening rack, wherein upper surfaces or lower surfaces of a plurality of first supporting rods, which are parallel to one another and arranged at intervals, are overlaid with a plurality of second supporting rods, which are parallel to one another and arranged at intervals and intersect with the first supporting rods, and riveting holes configured at positions, where the first supporting rods intersect with the second supporting rods, are in hinged connection through rivets to form the latticed greening rack; according to the specific structure of each rivet, an upper end face of a base is centrally provided with a first column; the upper end of the first column is provided with a first cone boss; an upper end face of the first cone boss is centrally provided with a second column; an upper end of the second column is provided with a second cone boss; the outer diameter of the first cone boss and the outer diameter of the base are both greater than the outer diameter of the first column, the outer diameter of the second cone boss is greater than the outer diameter of the second column, and the outer diameter of the first cone boss is greater than the outer diameter of the second cone boss.

Both the first supporting rods and the second supporting rods are hollow rectangular tubes, round tubes or flat tubes.

The outer diameter of the first columns is greater than the outer diameter of the second columns.

The rivets are each of an integral solid structure obtained through injection molding.

Both the first supporting rods and the second supporting rods are made of plastics.

The outer diameter of the first columns is matched with the inner diameter of the riveting holes configured at positions where the first supporting rods intersect with the second supporting rods.

An artificial plant is inserted in the second column of each rivet.

Each artificial plant comprises an ornamental part integrally formed and an insertion part connected to the bottom of the ornamental part. In the insertion part, two or more connecting pillars are formed and spaced apart on one end face of a cylindrical boss or a conical boss with a center hole, an outer end of each connecting pillar is connected to the bottom of the ornamental part, and the inner diameter of the center hole is matched with the outer diameter of the second column.

The ornamental parts are plastic artificial flowers, or artificial flowers with artificial leaves, or artificial leaves, or artificial branches and leaves.

Compared with the prior art, the foldable greening rack has the following outstanding and beneficial technical effects:

1. the first supporting rods and the second supporting rods of the greening rack are formed by means of the solid rivets through riveting connection, the artificial plants can be assembled and inserted in the greening rack, in this way, complicated production processes like winding and tying are omitted, raw materials are saved, the production process is simple, and the production cost is low;

2. the solid rivets have high strength, a long service life and a good anti-detachment effect, which is not prone to detachment and attractive in appearance;

3. due to the fact that the artificial plants can be easily inserted into the second cone boss of each rivet of the greening rack, the greening rack and the artificial plants can be packaged and transported separately, and can also be packaged and transported after being well assembled, and diversified transportation demands of users can be met easily; and 4. the foldable greening rack has the advantages that the structure is simple, installation is easy, the production cost is low, the artificial plants are not prone to detachment after being inserted in the greening rack, and the appearance is attractive, and the foldable greening rack is suitable for indoor and outdoor isolation area greening or space greening.

DETAILED DESCRIPTION OF EMBODIMENTS

Figure 1:
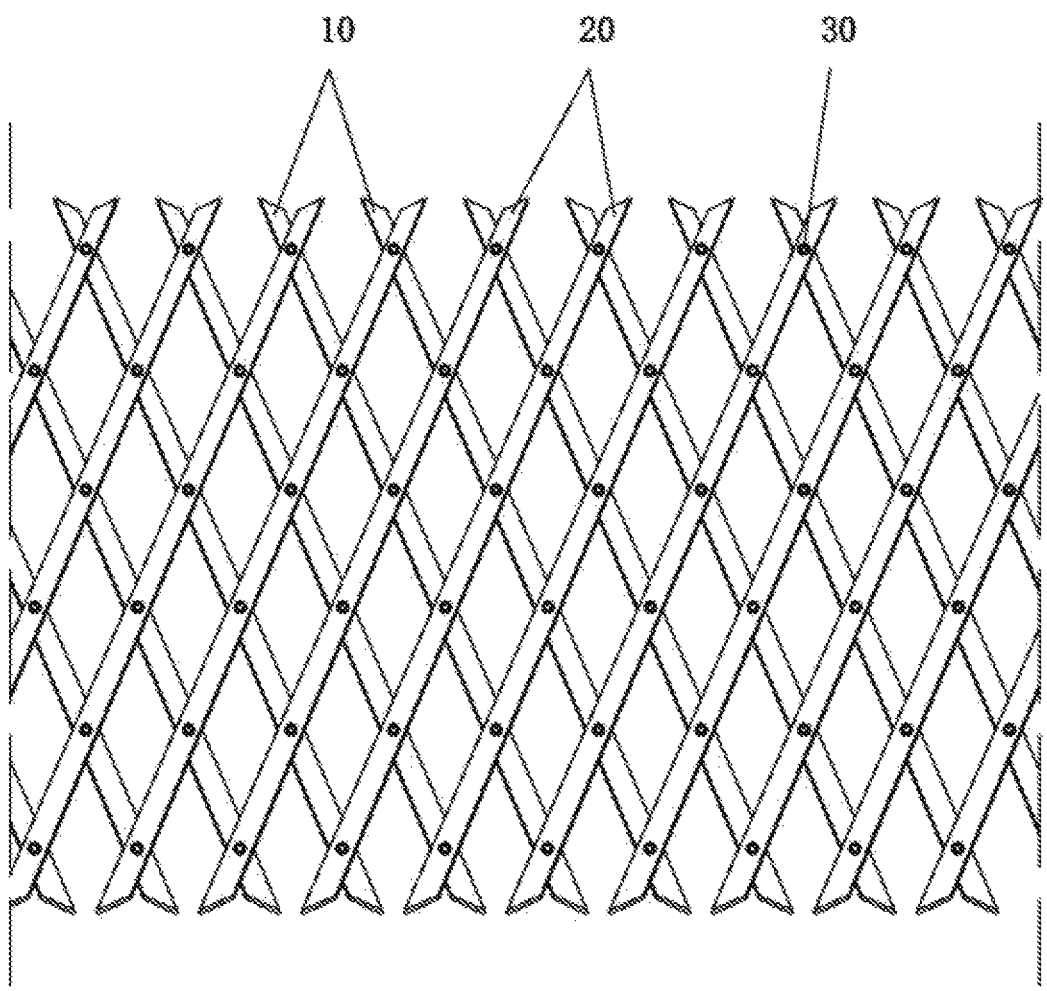
FIG. 1 is a front schematic diagram of the present invention without inserted artificial plants.
Figure 2:
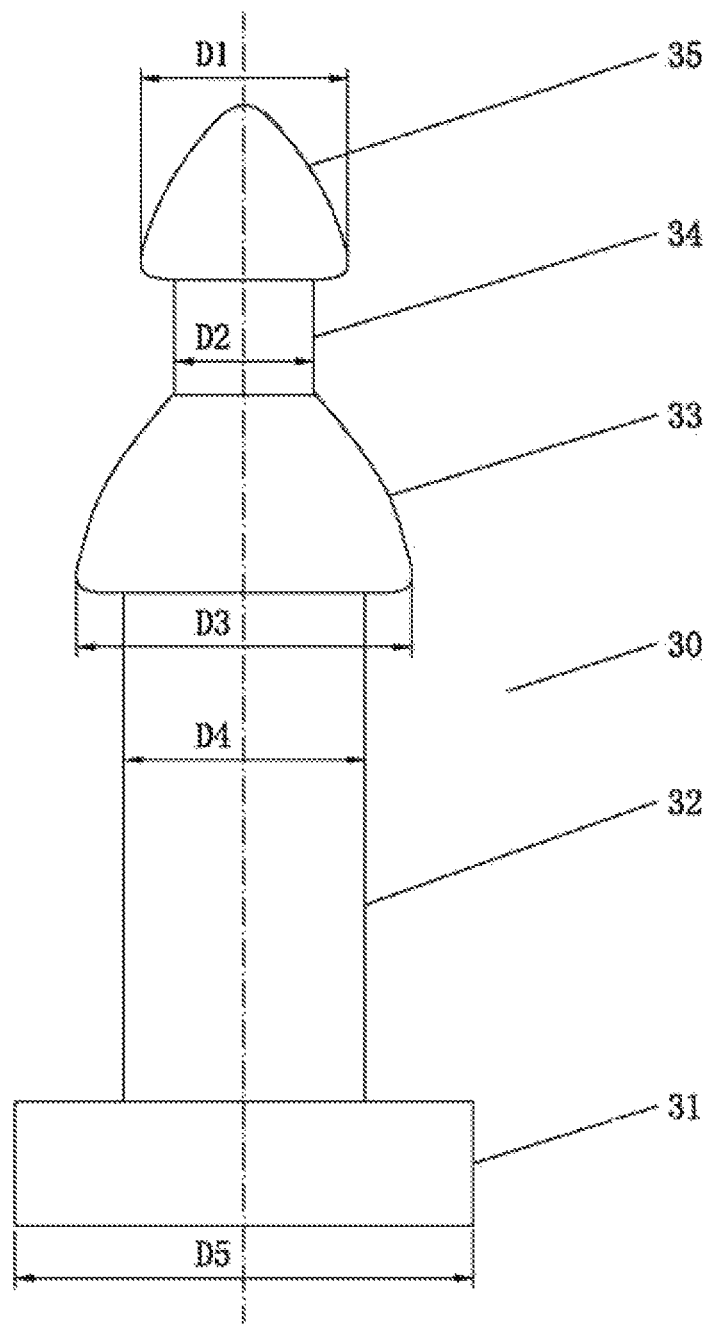
FIG. 2 is a front view of a rivet of the present invention.
Figure 3:
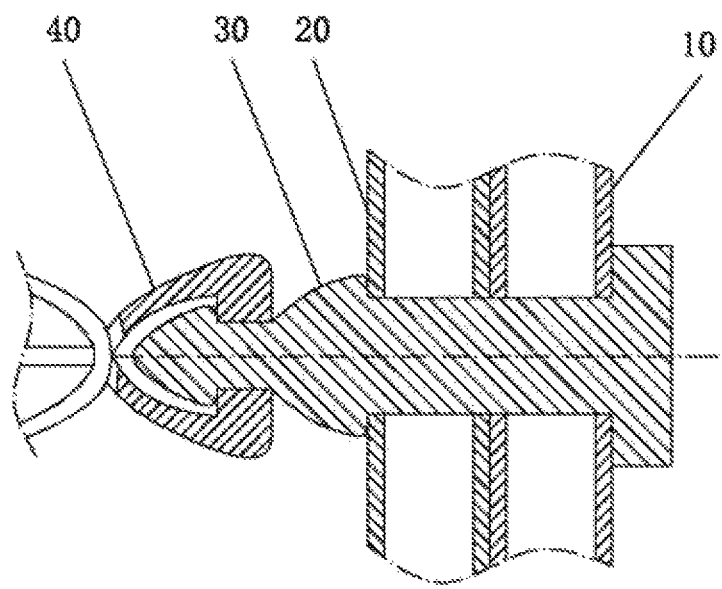
FIG. 3 is a local section view of the present invention.
Figure 4:
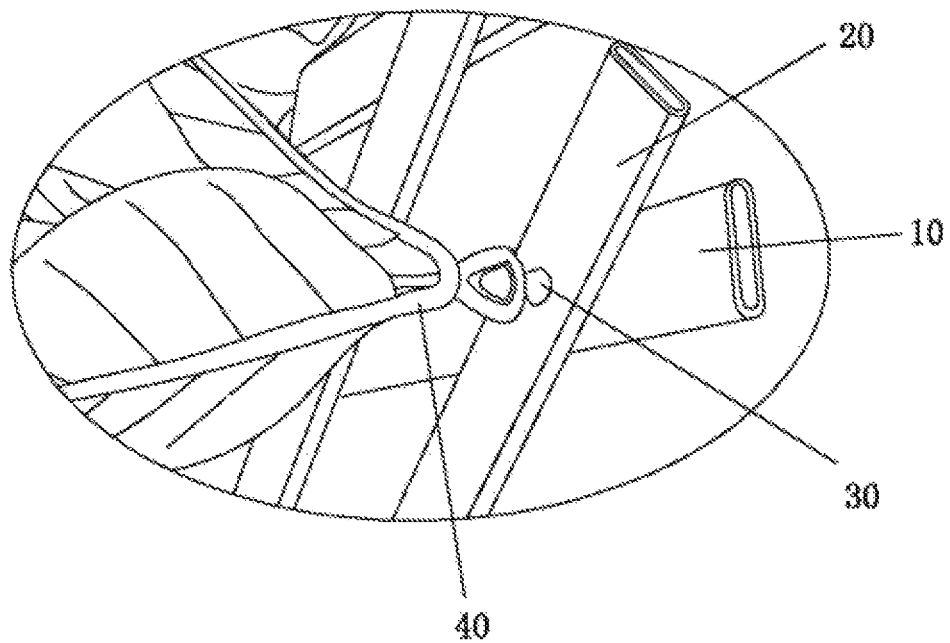
FIG. 4 is a local perspective view of the present invention.
Figure 5:
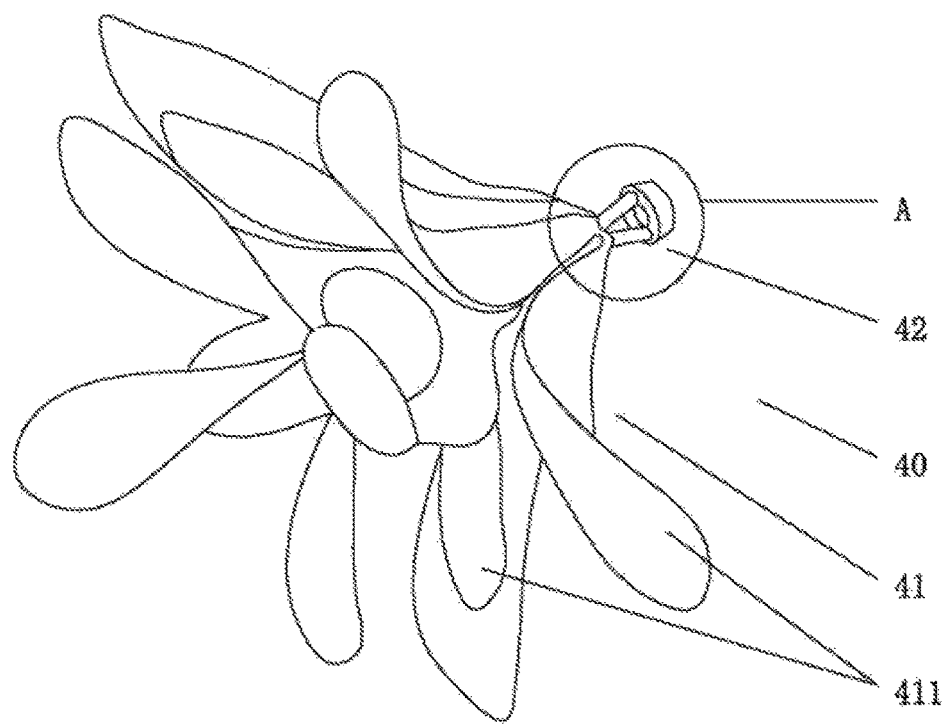
FIG. 5 is a schematic perspective view of an artificial plant of the present invention.
Figure 6:
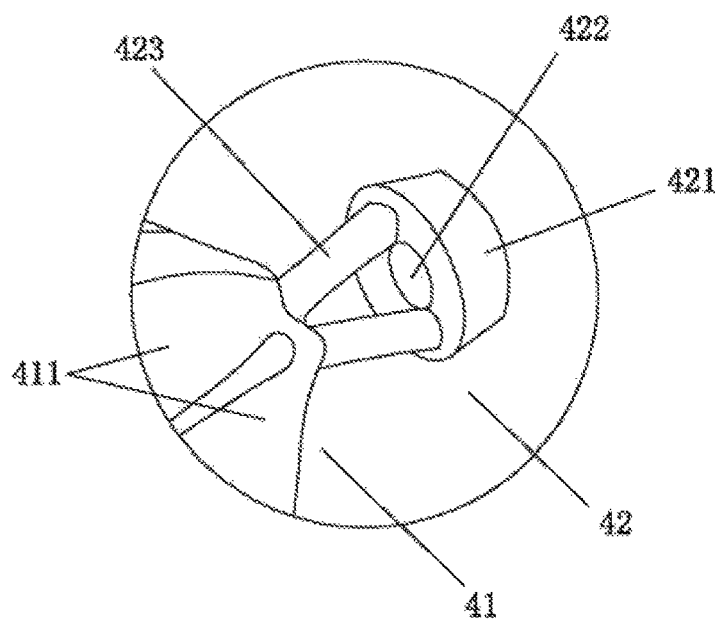
FIG. 6 is an enlarged view of a part A of FIG. 5.

The present invention is further described with reference to accompanying drawings and a specific embodiment (see FIGS. 1-6):

depicted is a foldable greening rack, wherein upper surfaces or lower surfaces of a plurality of first supporting rods 10 which are parallel to one another and arranged at intervals are overlaid with a plurality of second supporting rods 20 which are parallel to one another and arranged at intervals and intersect with the first supporting rods 10, and riveting holes configured at positions, where the first supporting rods 10 intersect with the second supporting rods 20, are in hinged connection through rivets 30 to form the latticed greening rack; according to the specific structure of each rivet 30, an upper end face of a base 31 is centrally provided with a first column 32; the upper end of the first column 32 is provided with a first cone boss 33; an upper end face of the first cone boss 33 is centrally provided with a second column 34; an upper end of the second column 34 is provided with a second cone boss 35, or a conical body, or a mushroom-shaped body; the outer diameter D3 of the first cone boss 33 and the outer diameter D5 of the base 31 are both greater than the outer diameter D4 of the first column 32, the outer diameter D1 of the second cone boss 35 is greater than the outer diameter D2 of the second column 34, and the outer diameter D3 of the first cone boss 33 is greater than the outer diameter D1 of the second cone boss 35.

Both the first supporting rods 10 and the second supporting rods 20 are hollow rectangular tubes, round tubes or flat tubes.

The outer diameter D4 of the first columns 32 is greater than the outer diameter D2 of the second columns 34.

The rivets 30 are each of an integral solid structure obtained through injection molding.

Both the first supporting rods 10 and the second supporting rods 20 are made of plastics.

The outer diameter D4 of the first columns 32 is matched with the inner diameter of the riveting holes configured at positions where the first supporting rods 10 intersect with the second supporting rods 20.

An artificial plant 40 is inserted in the second column 34 of each rivet 30.

Each artificial plant 40 comprises an ornamental part 41 integrally formed and an insertion part 42 connected to the bottom of the ornamental part 41. In the insertion part 42, two or more connecting pillars 423 are formed and spaced apart on one end face of a cylindrical boss or a conical boss 421 with a center hole 422, an outer end of each connecting pillar 423 is connected to the bottom of the ornamental part 41, and the inner diameter of the center hole 422 is matched with the outer diameter D2 of the second column 34.

The ornamental parts 41 are plastic artificial flowers, or artificial flowers with artificial leaves 411, or artificial leaves 411, or artificial branches and leaves.

The above-described embodiment is only a preferred embodiment of the present invention, and is not intended to limit the protection scope of the present invention. Accordingly, all equivalent modifications made according to the structure, shape and principle of the invention should be considered as falling within the protection scope of the invention.

What is claimed is:

1. A foldable greening rack comprising:
   a plurality of first supporting rods paralleled to one another and arranged at intervals, and a plurality of second supporting rods paralleled to one another and arranged at intervals; and
   the plurality of first supporting rods are turnablely connected with the plurality of second supporting rods by a riveting device;
   the riveting device comprising:
   riveting holes located at intersecting points of the plurality of first supporting rods with the plurality of second supporting rods;
   quick assembly rivets, each one has a base, an upper end face of the base is centrally provided with a first column; the upper end of the first column is provided with a first cone boss, an upper end face of the first cone boss is centrally provided with a second column, an upper end of the second column is provided with a second cone boss; the outer diameter of the first cone boss and the outer diameter of the base are both greater than the outer diameter of the first column, the outer diameter of the second cone boss is greater than the outer diameter of the second column, and the outer diameter of the first cone boss is greater than the outer diameter of the second cone boss, the outer diameter of the first column is matched with the inner diameter of the riveting hole;
   each quick assembly rivet is of an integral solid structure obtained through injection molding.

2. The foldable greening rack according to claim 1, characterized in that both the first supporting rods and the second supporting rods are hollow rectangular tubes, round tubes or flat tubes.

3. The foldable greening rack according to claim 1, characterized in that the outer diameter of the first columns is greater than the outer diameter of the second columns.

4. The foldable greening rack according to claim 1, characterized in that both the first supporting rods and the second supporting rods are made of plastics.

5. The foldable greening rack according to any one of claim 1, characterized in that an artificial plant is inserted in the second column of each rivet.

6. The foldable greening rack according to claim 5, characterized in that each artificial plant comprises an ornamental part integrally formed and an insertion part connected to the bottom of the ornamental part; in the insertion part, two or more connecting pillars are formed and spaced apart on one end face of a cylindrical boss or a conical boss with a center hole; an outer end of each connecting pillar is connected to the bottom of the ornamental part; and the inner diameter of the center hole is matched with the outer diameter of the second column.

7. The foldable greening rack according to claim 6, characterized in that the ornamental parts are plastic artificial flowers, or artificial flowers with artificial leaves, or artificial leaves, or artificial branches and leaves.

* * * * *